United States Patent [19]

Yamoto

[11] Patent Number: 4,893,429
[45] Date of Patent: Jan. 16, 1990

[54] TOP GUIDE FOR A FISHING ROD
[75] Inventor: Yoshiro Yamoto, Sakai, Japan
[73] Assignee: Shimano Industrial Company Limited, Osaka, Japan
[21] Appl. No.: 268,978
[22] Filed: Nov. 9, 1988
[30] Foreign Application Priority Data Nov. 11, 1987 [JP] Japan .............................. 62-172989[U]

[51] Int. Cl.⁴ .............................................. A01K 87/04
[52] U.S. Cl. ............................................ 43/24; 43/25
[58] Field of Search .................... 43/4, 18.1, 24, 25; 254/190 D; 242/157

[56] References Cited
U.S. PATENT DOCUMENTS

| | | | |
|---|---|---|---|
| 703,996 | 7/1902 | Cattley | 43/24 |
| 1,844,044 | 1/1927 | Pflueger | 43/24 |
| 2,697,894 | 12/1954 | Graham et al. | 43/24 |
| 2,724,204 | 6/1952 | Wiglesworth | 43/24 |
| 4,196,537 | 4/1980 | Ohmura | 43/24 |

Primary Examiner—Nicholas P. Godici
Assistant Examiner—Michael William Starkweather
Attorney, Agent, or Firm—Stevens, Davis, Miller & Mosher

[57] ABSTRACT

A top guide for a fishing rod is provided which includes a line guide ring for guiding a fishing line and a mounting portion to be mounted to the tip of the fishing rod. The line guide ring and mounting portion are connected by a connector having an elastically deformable portion which buffers an impact applied axially to the line guide ring when the fishing line is wound onto a spool of a fishing reel.

2 Claims, 1 Drawing Sheet

TOP GUIDE FOR A FISHING ROD

FIELD OF THE INVENTION

The present invention relates to a top guide mounted on a tip of a fishing rod, and more particularly, to a top guide comprising a mounting portion to be mounted to the rod tip and a line guide ring for guiding a fishing line led from a root portion of the fishing rod to the rod tip.

BACKGROUND OF THE INVENTION

Generally, a top guide is mounted on the tip of a fishing rod which carries at its root portion a fishing reel and is provided at an intermediate portion between the root and the tip portions with a plurality of intermediate line guides so that a fishing line wound on a spool is drawn out therefrom and led out from the tip of the fishing rod through the intermediate guides and the top guide. A fishing rig, for example, a lure, is attached to the utmost end of the fishing line for fishing.

The conventional top guide, as shown, for example, in FIG. 4, is constructed such that at one lengthwise end of a tubular mounting portion B mounted to tip A of the fishing rod is fixed a metallic outer ring C at a line guide ring E comprising outer ring C and a guide ring D preferably of ceramic and fixed to the inner periphery thereof. A reinforcing stay F to prevent line guide ring E from inclining with respect to mounting portion B is mounted across a lengthwise intermediate portion of mounting portion B and one side of outer ring C at line guide ring E.

In a case where the fishing rod is provided at tip A thereof with a top guide constructed as described above and at its root with a fishing reel and a lure is attached to the utmost end of the line so as to carry out lure fishing, when the line having the lure attached thereto is wound up excessively on the spool, the lure may hit line guide ring E at the top guide. In this case, tip A, when made soft and easily flexible, deflects to buffer an impact by the lure, whereby there is no problem, but when made hard and difficult to deflect, line guide ring E is subjected to an impact load when hit by the lure, thereby causing a problem in that guide ring D may break or dislodge from outer ring C.

SUMMARY OF THE INVENTION

An object of the invention is to provide a top guide which is protected from being broken even when a line guide ring is subjected to an external impact load such that the fishing line is wound up excessively onto a fishing reel and a lure at the utmost end of the line hits the line guide ring.

The top guide of the invention comprises a line guide ring for guiding the fishing line and a mounting portion to be mounted to the tip of the fishing rod, wherein between the line guide ring and the mounting portion is provided a connector for connecting the line guide ring and mounting portion, the connector having an elastically deformable portion which is elastically deformed to buffer an impact applied axially of the line guide ring.

Therefore, when a top guide constructed as described above is employed and when a fishing rig, such as a lure, is attached to the line and a fishing reel is mounted to the fishing rod so as to perform lure fishing, the line guide ring is protected from being broken even when hit by the lure.

The above and further objects and novel features of the invention will be more fully apparent from the following detailed description when the same is read in connection with the accompanying drawings.

DETAILED DESCRIPTION OF THE INVENTION

Figure 1:
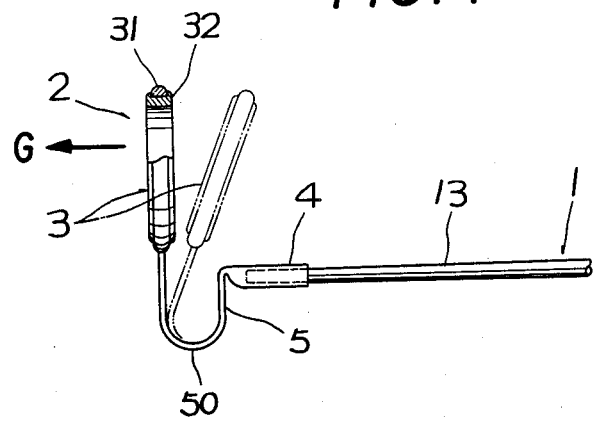
FIG. 1 is a partially cutaway side view of a first embodiment of a top guide of the invention.
Figure 2:
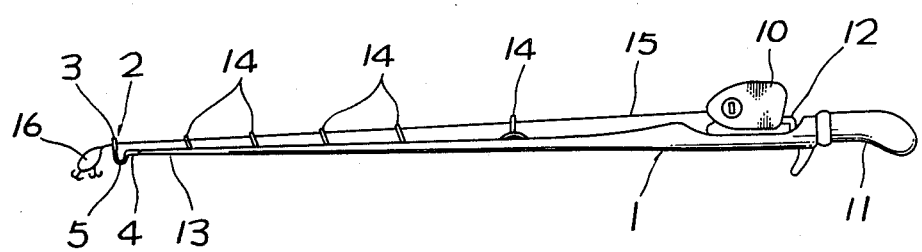
FIG. 2 is a schematic side view of a fishing rod carrying at the tip thereof the top guide in FIG. 1.

FIGS. 1 and 2 illustrate a first embodiment of a top guide for a fishing rod of the invention.

FIG. 2 shows a fishing rod 1 for lure fishing, having a double bearing type fishing reel 10 mounted thereon. Specifically, a fixture 12 for reel 10 is attached to fishing rod 1 adjacent to a grip 11 thereof. Reel 10 is fixed to fixture 12, and top guide 2 of the invention is attached to tip 13 of fishing rod 1. A plurality of intermediate guides 14 are attached to a lengthwise intermediate portion of fishing rod 1 respectively.

Top guide 2 of the invention is constructed as follows. Top guide 2 is basically provided with a line guide ring 3 for guiding a fishing line 15 and a mounting portion 4 to be mounted to tip 13 of fishing rod 1. Line guide ring 3 comprises a metallic outer ring 31 and a ceramic guide ring 32 fitted into the inner periphery of outer ring 31. Line guide ring 3 and mounting portion 4 are connected with each other through a connector 5 having an elastically deformable portion 50 which is elastically deformed to buffer an impact axially applied to line guide ring 3.

In the first embodiment shown in FIGS. 1 and 2, an elastically deformable material, which may be either in the form of a metal wire rod or plate, is bent in a substantially U-shaped to form connector 5 having elastically deformable portion 50 of a substantially U-shaped. In the embodiment in which connector 5 is a plate, the plate has a widthwise dimension perpendicular to an axial direction G of line guide ring 31. Connector 5 is connected at one end with tubular mounting portion 4 and is welded at its other end to the lower portion of the outer periphery of outer ring 31 of line guide ring 3, and mounting portion 4 is fixedly fitted onto tip 13 of fishing rod 1.

In addition, the top guide of the invention is mounted to fishing rod 1 oriented upwardly with respect to tip 13. Alternatively, the top guide may be attached to fishing rod 1 in a horizontal orientation. Thus, line guide ring 3 is not limited with respect to its orientation. In brief, the top guide need only be mounted to tip 13 in any direction capable of easily guiding fishing line 15.

Next, explanation will be given concerning operation of top guide 2. Fishing line 15 drawn out from reel 10 passes the line guide rings of intermediate guide 14 and line guide ring 3 of top guide 2, and a lure 16 is tied to the utmost end of line 15 for lure fishing.

When fishing line 15 is wound excessively onto reel 10, lure 16 hits line guide ring 3, at which time elastically deformable U-shaped portion 50 of connector 5 bends as shown by the two-dot chain line in FIG. 1 so that line guide ring 3 is displaced toward fishing reel 10, thereby absorbing impact energy caused when the lure hits the top guide.

Therefore, an impact load applied to line guide ring 3 when hit by the lure is restricted, resulting in that guide ring 32 of line guide ring 3 may be broken or outer ring 31 may dislodge therefrom.

In addition, line guide ring 3, after the impact is absorbed, is restored in position by an elastic restoring force of connector 5.

Alternatively, outer ring 31 may be integral with connector 5. Also, connector 5, mounting portion 4 and outer ring 31 may be integrally formed of, for example, elastic synthetic resin.

Figure 3:
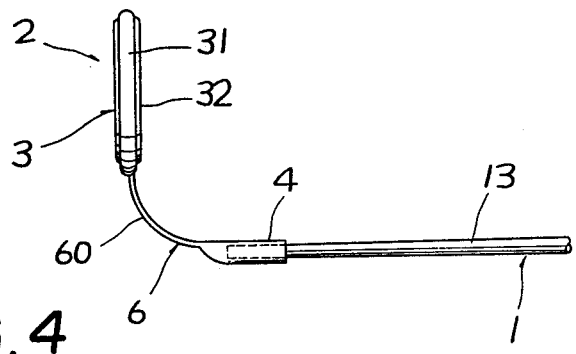
FIG. 3 is a side view of a second embodiment of the top guide of the invention.
Figure 4:
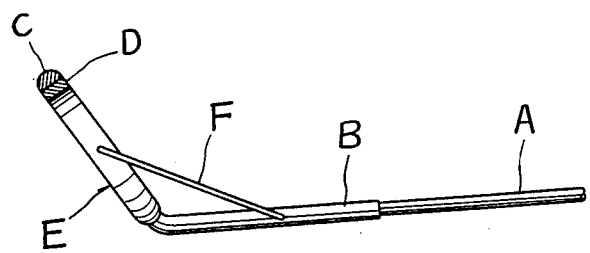
FIG. 4 is a partially cutaway side view exemplary of the conventional top guide.

Alternatively, as shown by a second embodiment in FIG. 3, a connector 6 may be formed of an elastically deformable material, which may be either in the form of a metal wire rod or plate, and bent in a circular arc so that the circular arc portion is used as an elastically deformable portion 60.

As seen from the above, the top guide of the invention includes line guide ring 3 and mounting portion 4 connected by connector 5 or 6 having an elastically deformable portion 50 or 60. Due to this structure, even when the fishing line is carelessly excessively wound up and line guide ring 3 is hit by the lure at the utmost end of the fishing line, connector 5 buffers the impact applied to line guide ring 3, thereby avoiding breakage of line guide ring 3.

Although several embodiments have been described, they are merely exemplary of the invention and not to be construed as limiting, the invention being defined solely by the appended claims.

What is claimed is:

1. A top guide adapted to be mountd to the tip of a fishing rod, said top guide comprising:
   a mounting portion for mounting on the tip;
   a line guide ring for guiding a fishing line adapted to extend along the fishing rod toward the tip; and
   a connector interconnecting said mounting portion and said line guide ring, said connector being formed of a plate having a given width, having its widthwise dimension perpendicular to an axial direction of said line guide ring, coupled at one lengthwise end to said mounting portion and at its other lengthwise end to said line guide ring, and having an elastically deformable lengthwise intermediate portion curved in a circular arc shape which is adapted to be elastically displaced in said axial direction thereof but not in a direction perpendicular to said axial direction responsive to an impact applied to said line guide ring to thereby buffer said impact.

2. A top guide according to claim 1, wherein said line guide ring comprises an outer ring and a guide ring positioned at an inner periphery of said outer ring, said guide ring, connector and mounting portion being integrally formed in a one-piece configuration of elastically deformable synthetic resin.

* * * * *